June 16, 1964 G. H. BINGHAM, JR 3,137,749
LABELED SHOE SOLE AND METHOD OF MAKING THE SAME
Filed Aug. 30, 1960

INVENTOR.
GEORGE H. BINGHAM, JR.
BY *Roberts, Cushman & Grover*
ATT'YS.

3,137,749
LABELED SHOE SOLE AND METHOD OF
MAKING THE SAME
George H. Bingham, Jr., Westminster, Md., assignor to Cambridge Rubber Company, Taneytown, Md., a corporation of Maryland
Filed Aug. 30, 1960, Ser. No. 52,892
7 Claims. (Cl. 264—244)

This invention pertains to footwear of the type wherein an outer sole of waterproof material, for example, rubber or a synthetic plastic, is employed and more especially to a method of applying a prepared label to the undersurface of the outer sole. According to one common procedure in the manufacture of footwear having outer soles of the above character, the outer sole blank is die-cut from sheet material in uncured or partially cured condition, and this blank is then placed upon the bottom plate of a mold, the bottom of the lasted shoe upper is disposed in contact with the upper surface of the outer sole blank, and the assembled parts are subjected to pressure and heat whereby the upper and outer sole are integrally bonded together at the same time that the outer sole is cured.

Shoe manufacturers like to have certain indicia appear on an exposed surface of the outer sole of the completed shoe, for instance, the trade name applied to that particular style of shoe or the name of the manufacturing company. The simplest and cheapest way of so doing, provided it were practical, would be to make a label of fully cured rubber or plastic, having impressed thereon or therein the desired words or other indicia, and then to stick this label to the bottom or edge of the outersole after the shoe has otherwise been completed. However, labels so attached often become loose and eventually drop or are scuffed off.

Another method has been to provide the bottom mold plate with the desired indicia, formed thereon or therein, as by engraving or casting, and either in cameo or intaglio, so as to impress in the material of the outer sole itself, the desired words or other indicia. Such molds are very expensive and a different mold plate may be required for each size or style of shoe, so that this procedure adds very materially to the cost of manufacture, and the resultant indicia, being of the same color as the sole itself, are not so eye-arresting as may be desirable.

According to a further prior method, a label of gum rubber is placed upon the bottom plate of the mold, beneath the sole blank preparatory to the assembly of the outer sole and lasted upper, but when such a procedure is followed, the fluent material of the outer sole is intruded, in response to the applied pressure, between the label and the bottom of the mold with the result that portions of the label are overlain by outer sole material so that the intended purpose of the label is defeated and the appearance of the shoe, when placed on sale, is not as neat as would be desirable.

The present invention has for its principal object the provision of a novel method of procedure whereby it is made practical to bond a prepared label to the outer sole during the assembling and curing operation without danger that the label will be concealed or disfigured by the material of the outer sole as said material flows under pressure. A further object is to provide an outer sole having a reinforced anti-slip wear surface.

Other and further objects and advantages of the invention will be pointed out in the following more detailed description, and by reference to the accompanying drawings wherein.

Figure 1:
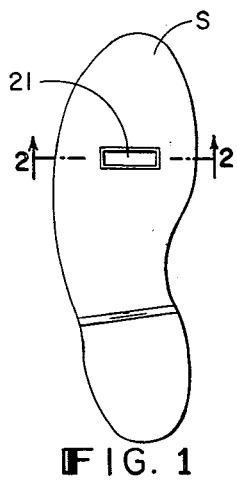
FIG. 1 is a diagrammatic small-scale bottom view of a completed shoe of the above type, showing a label as applied by the present process.

Referring to the drawings, FIG. 1 is a diagrammatic bottom view of a shoe, in accordance with the present invention, wherein the sole S is of rubber, rubber compound, plastic or other elastomeric material, having a label 21, for example, an ordinary gum label integrally bonded to its surface.

Figure 3:
FIG. 3 is a plan view of a conventional gum label.
Figure 4:
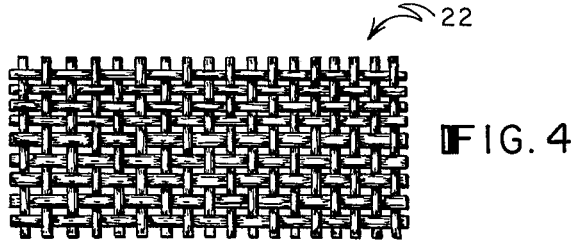
FIG. 4 is a plan view of a label-protecting and sole-reinforcing element employed in accordance with the present invention.

In accordance with the present invention, the previously prepared label 21, which may be of conventional type, as illustrated in FIG. 3, is laid upon the upper surface of the bottom mold M (FIG. 6) of the machine which is employed in uniting the lasted upper of the shoe to the outer sole—the label being so located, when placing it upon the surface of the mold, that it will occupy the desired position in the completed shoe. In placing the label upon the surface of the mold, that face of the label which is to be exposed during the wear of the shoe is placed in contact with the mold.

Figure 6:
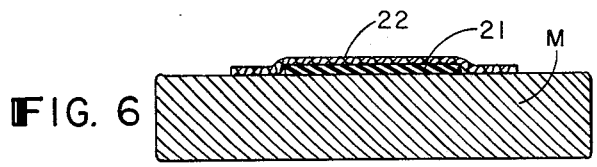
FIG. 6 is a diagrammatic transverse section through the bottom member of a mold, showing the label and protecting element positioned in readiness for assembly with the outer sole.
Figure 2:
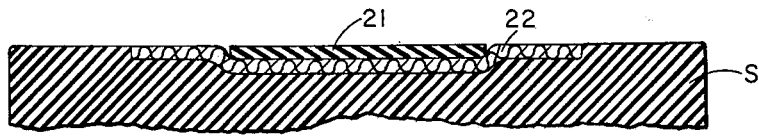
FIG. 2 is a fragmentary transverse section, on the line 2—2 of FIG. 1, to larger scale and omitting the shoe upper.
Figure 5:
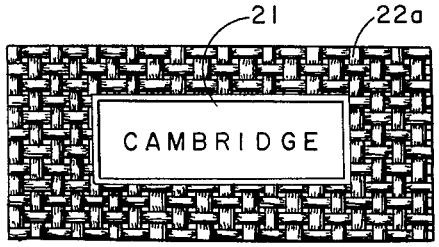
FIG. 5 is a plan view showing a label assembled with the protective element in readiness to be attached to the outersole.

Over the label thus positioned there is laid a label protecting element, for example, a piece of coarse textile material such as ordinary burlap or, if desired, Fiberglas fabric. This piece of fabric is of a size such that, when properly laid upon the label, it will extend outwardly beyond the edge of the label at all points. An extension of the protective device beyond the edge of the label of ³⁄₁₆ of an inch is usually ample for this purpose. Instead of placing the label and fabric successively upon the mold, as above suggested, the label may be laid upon the protector and adhered to the latter at the proper location and then the unit, thus prepared, may be placed upon the upper surface of the mold member M with the label below the fabric, as illustrated in FIG. 6. Whether the label and fabric are arranged upon the sole member in one or the other of the ways above suggested, the sole blank is now placed over the protector 22; the bottom of the lasted shoe is placed upon the sole blank and, after properly positioning the other parts of the mold (not here shown) with the bottom member M, the molding machine is actuated in the usual manner to apply pressure and heat such as adhesively to bond the shoe bottom to the outer sole. During this molding operation the plastic material of the sole blank is forced into the interstices of the coarse fabric. Some of this material passes through the mesh of this fabric and contacts the label thus providing an adhesive bond which permanently unites the label and fabric to the sole, and with the exposed surface of the label and protector substantially flush with the tread surface of the outersole. At the margin of the protector, beyond the label, the plastic material likewise fills the interstices of the fabric, but the threads of the fabric provide a barrier which resists lateral flow of the plastic so that substantially none of the plastic enters between the surface of the mold and the label. Thus the fabric acts as a protector for the label during the molding operation, preventing the exposed surface of the label from contamination by the plastic of the sole blank. Since the margin of the fabric, beyond the edge of the label, directly contacts the surface of the mold M, the plastic does not form a continuous layer or film across the lower face of the fabric, although it so permeates the fabric structure as, in large measure to conceal or camouflage the fabric at the tread surface of the completed sole.

Obviously, the label may be located at any desired part of the shoe sole. If desired, the fabric may be of a color such that, although impregnated with the plastic, it will define an area surrounding the label which contrasts in shade with that of the remainder of the sole. In such case, especially, it may be desirable to cut the fabric initially to some ornamental shape, for example, as illustrated in FIG. 7 and, in that event, the resultant area of contrasting color would provide a distinctive effective and emphasize the presence of the label.

Figures 7, 8:
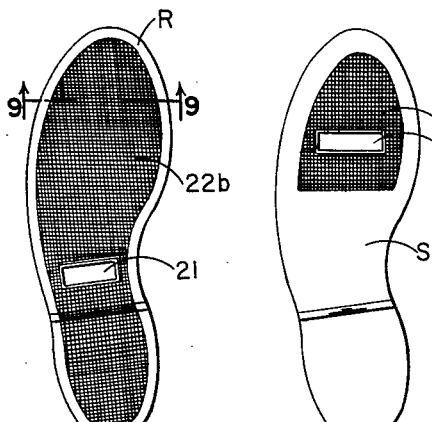
FIG. 7 is a bottom view of a shoe, having a label protective element of ornamental shape and a label adhered thereto.
FIG. 8 is a bottom view of a sole showing a label protective element, of the type above referred to, which covers substantially the whole surface of the shoe sole.
Figure 9:
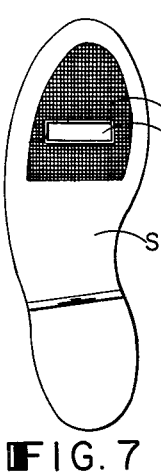
FIG. 9 is a section, to larger scale, showing the shoe sole of FIG. 6 and a label protective element embedded therein.

Furthermore, the protective element may be of a shape and size such as to cover substantially the entire area of the outer sole as illustrated, for example, in FIGS. 8 and 9, wherein only a narrow marginal rib R of the plastic sole itself forms an enclosing border for the fabric 22b. Such an arrangement not only provides the desired protection for the label but also constitutes a reinforcing medium for the shoe sole. Material such as burlap or Fiberglas, above referred to, not only makes the sole tough and wear-resistant, but also affords a uniformly rough surface useful in preventing accidental slipping. Obviously, if desired, the surface of the mold bottom M may be provided with alternating ribs and grooves, as is common in the art, thereby to enhance its anti-slipping character, since the fabric, being flexible, readily conforms to a surface of ribbed contour.

While certain embodiments of the invention have herein been illustrated and described by way of example, it is to be understood that the invention is broadly inclusive of any and all modifications such as fall within the scope of the appended claims.

I claim:

1. The method of so attaching a prepared label to the bottom of an outer sole of incompletely cured elastomeric material while bonding a shoe upper to said outer sole as to prevent material of the outer sole from disfiguring the exposed face of the label, which comprises as steps: providing a label of a waterproof material such as is capable of making an integral bond with the material of the outer sole, providing a label protector of flexible pervious sheet material and of an area exceeding that of the label, so assembling the label with the label protector that the face of the label is exposed while the marginal portion of the protector is exposed at all sides of the label, causing the label to adhere to the protector, placing the assembled label and protector on the bottom plate of the mold which is to be used in uniting the lasted shoe upper to the outer sole with the exposed face of the label in direct contact with said mold plate, placing an incompletely cured outer sole blank upon the protector, placing a lasted shoe upon the outer sole blank, and completing the shoe according to customary procedure by applying heat and pressure, and thereby causing portions of the material of the sole blank to protrude through the interstices of the protector and permanently bond the label to the completed outer sole while concomitantly the protector functions to prevent material of the outer sole blank from intruding between the surface of the mold and the label.

2. The method according to claim 1, wherein the label protector is a coarse woven textile fabric.

3. The method according to claim 1, wherein the label protector is a piece of burlap substantially larger in area than the label and of an ornamental shape.

4. The method according to claim 1, wherein the label protector is a piece of coarse woven textile material of a size and shape closely approximating that of the insole blank, and the label is disposed transversely of the shank portion of said protector.

5. The method of so providing an outer sole of elastomeric material with a label as to prevent material of the outer sole from defacing the exposed surface of the label, which comprises as steps: providing a previously prepared gum label, providing a piece of pervious woven fabric of a size larger than the label, assembling the label and piece of fabric upon a mold plate with that surface of the label which is to be exposed, when the sole is completed, in contact with the mold plate and with the piece of fabric overlying the label and with the fabric extending beyond the edges of the label at all points of the latter, placing a sole blank of elastomeric material upon the label, and so applying heat and pressure to the sole blank as to cause material of the blank to flow and penetrate the fabric thereby adhesively and permanently bonding the fabric and label to the completed sole while concomitantly the fabric acts as a barrier to prevent intrusion of material of the sole blank between the surface of the mold and the exposed face of the label.

6. The method according to claim 5, wherein the fabric is coarse burlap.

7. The method according to claim 5, wherein the fabric is of a size and shape such as to cover the entire surface of the sole blank except a narrow marginal portion of the latter.

References Cited in the file of this patent

UNITED STATES PATENTS

| | | |
|---|---|---|
| 1,281,540 | Engel | Oct. 15, 1918 |
| 1,354,734 | Ferguson | Oct. 5, 1920 |
| 1,520,224 | Bush | Dec. 23, 1924 |
| 1,827,127 | Weamer | Oct. 31, 1931 |
| 1,845,008 | Wallace | Feb. 16, 1932 |
| 1,936,729 | Mebane | Nov. 28, 1933 |
| 1,952,409 | Berg | Mar. 27, 1934 |
| 2,037,105 | West | Apr. 14, 1936 |
| 2,103,157 | Jaumandreu | Dec. 21, 1937 |
| 2,319,156 | Perkins | May 11, 1943 |
| 2,795,822 | Long | June 18, 1957 |
| 2,956,313 | Choice | Oct. 18, 1960 |